(12) United States Patent
Sun

(10) Patent No.: US 7,119,291 B2
(45) Date of Patent: Oct. 10, 2006

(54) TOUCH PAD DEVICE FOR PORTABLE COMPUTER

(75) Inventor: You Myoung Sun, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 11/373,512

(22) Filed: Mar. 13, 2006

(65) Prior Publication Data

US 2006/0201792 A1  Sep. 14, 2006

(30) Foreign Application Priority Data

Mar. 14, 2005  (KR) ...................... 10-2005-0021151

(51) Int. Cl.
*H01H 9/00* (2006.01)
(52) U.S. Cl. ...................... 200/5 A; 345/157; 345/173; 200/343
(58) Field of Classification Search ................ 200/5 A, 200/517, 600, 296, 341–345; 361/680–686; 341/22; 345/156–173
See application file for complete search history.

(56) References Cited

U.S. PATENT DOCUMENTS

| | | | | |
|---|---|---|---|---|
| 4,311,893 A * | 1/1982 | Tsuchiya et al. | ............ | 200/344 |
| 6,080,940 A * | 6/2000 | Rice | ............................ | 200/5 A |
| 6,177,924 B1 * | 1/2001 | Bae | ............................. | 345/157 |
| 6,219,038 B1 * | 4/2001 | Cho | ............................. | 345/173 |
| 6,239,726 B1 * | 5/2001 | Saida | ......................... | 340/999 |
| 6,281,887 B1 * | 8/2001 | Wang | ......................... | 345/173 |
| 6,393,165 B1 * | 5/2002 | Yeh | ............................. | 382/325 |
| 6,727,447 B1 * | 4/2004 | Hentunen | ............... | 200/302.2 |
| 6,859,355 B1 * | 2/2005 | Chuang et al. | ............. | 361/680 |
| 6,933,921 B1 * | 8/2005 | Yasuda et al. | ............. | 345/157 |

* cited by examiner

*Primary Examiner*—Michael A. Friedhofer
(74) *Attorney, Agent, or Firm*—Fleshner & Kim, LLP

(57) ABSTRACT

A touch pad device for a portable computer includes a key deck (20); a touch region (24) formed on a portion of the key deck (20); penetration portions (28) extending through the key deck (20) while being adjacent to the touch region (24); push buttons (32) integrally formed with the key deck (20) while being able to deform elastically inside the penetration portions (28); a touch pad (40) formed on a lower surface of the key deck (20) in a position corresponding to the touch region (24) for information input; a cover button (30) mounted on an upper surface of the key deck (20) to cover at least the push buttons (32) and the penetration portions (28), the cover button (30) having first and second button units (31) and (31') able to deform elastically and compress the push buttons (32); and a board (42) having switches (44) toggled on/off by pushing the button units (31) and (31').

6 Claims, 3 Drawing Sheets

TOUCH PAD DEVICE FOR PORTABLE COMPUTER

BACKGROUND OF THE INVENTION

1. Field of the Invention

The present invention relates to a portable computer, and more particularly to a touch pad device used as an input device in a portable computer.

2. Description of the Prior Art

As generally known in the art, portable computers (e.g. laptop computers) are provided with a touch pad device or pointing stick, which is used as a pointing device instead of a mouse when the computers are carried. FIG. 1 shows a portable computer equipped with a touch pad device according to the prior art.

As shown, the portable computer generally includes a main unit 1 and a display unit 3. Both ends of the display unit 3 are connected to the rear end of the main unit 1 by hinge units 5 so that the display unit 3 can be folded on the upper surface of the main unit 1 or unfolded at a predetermined angle as shown in the drawing. The display unit 3 has a display screen 3', such as a liquid crystal panel.

The main unit 1 has a key deck 7 formed on the upper surface thereof and a number of keys 8 arranged on the key deck 7. Particularly, rows of keys 8 are arranged on the upper surface of the main unit 1 near the rear end thereof. The key deck 7 has an armrest 9 formed on the upper surface near the front end thereof so that hands of the user can rest thereon during typing operation using the keys 8. The armrest 9 has a touch pad device 10 positioned at the center thereof.

The construction of the touch pad device 10 is shown in detail in the magnified view of FIG. 1. The key deck 7 has a pad through-hole 11 and a button through-hole 12. The pad through-hole 11 has an approximately square shape, and the button through-hole 12 is closer to the front end of the key deck 7 than the pad through-hole 11.

A touch pad 13 is placed in the pad through-hole 11 from below the key deck 7. The touch pad 13 senses the touch of the user's hand when he inputs a desired pointing position. The touch pad 13 has a cable 14 and a connector 15 to transmit/receive signals to/from the outside.

A touch pad housing 16 is used to retain the touch pad 13 on the key deck 7. The touch pad housing 16 has a seating step 16', on which the touch pad 13, particularly, the edge of the lower surface of the touch pad 13 is seated.

The touch pad housing 16 has fastening bosses 17 to be mounted on the key deck 7. The fastening bosses 17 have fastening holes 17h formed thereon, through which screws extend to be fastened to the key deck 7.

The touch pad housing 16 has buttons 18 positioned so as to correspond to the button through-hole 12. The buttons 18 are used to select positional information, which is inputted with the touch pad 13.

A pad board 19 is equipped with various components for operating the touch pad 13, for example, switches 19' driven by the buttons 18.

However, conventional touch pad devices 10, constructed as above, have a problem in that they have a large number of components, including the touch pad 13, touch pad housing 16, buttons 18, and pad board 19. This makes it difficult to manage them and lengthens the assembly process.

In particular, the buttons 18 must be fastened to the lower surface of the key deck 7 by screws or fixed thereto by thermal bonding. This means that a separate tool (e.g. driver) or thermal bonding equipment is necessary.

When the buttons 18 are not firmly fixed to the key deck 7 or become loose after a long period of use, the switches 19' may not be pressed as desired. This means that the touch pad device 10 may fail to function properly. Since the buttons 18 are positioned on the lower surface of the key deck 7, they may detach from the key deck 7 when repeated pressed by the user.

SUMMARY OF THE INVENTION

Accordingly, the present invention has been made to solve the above-mentioned problems occurring in the prior art, and an object of the present invention is to provide a touch pad device having a small number of components.

Another object of the present invention is to provide a touch pad device having a switch pressing unit formed as an integral part with a key deck.

In order to accomplish these objects, there is provided a touch pad device for a portable computer including a key deck; a touch region formed on a portion of the key deck; penetration portions extending through the key deck while being adjacent to the touch region; push buttons integrally formed with the key deck while being able to deform elastically inside the penetration portions; a touch pad formed on a lower surface of the key deck in a position corresponding to the touch region for information input; a cover button mounted on an upper surface of the key deck to cover at least the push buttons and the penetration portions, the cover button having first and second button units adapted to deform elastically and compress the push buttons; and a board having switches toggled on/off by pushing the button units.

Push protrusions are formed on lower surfaces of the push buttons to make contact with the switches, respectively, and the push buttons are integrally connected to the key deck by first and second connection legs adapted to deform elastically.

The first and second connection legs are parallel to each other and connect the push buttons to the key deck.

The touch region has a touch sheet.

A seating channel is formed around a periphery of the touch region, and the penetration portions are formed inside the seating channel.

The cover button is mounted in the seating channel in a shape corresponding to a shape of the seating channel, and the first and second button units are delimited by a seam formed on the cover button and correspond to the respective push buttons.

The touch pad device for a portable computer according to the present invention is advantageous in that it has a minimized number of components, a simple assembly process, and a low manufacturing cost. No tool or equipment for thermal bonding is necessary, since the push buttons are integrally formed with the key deck. The positional relationship of the push buttons is always maintained correctly. This improves the operation reliability of the touch pad device.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Figure 1:
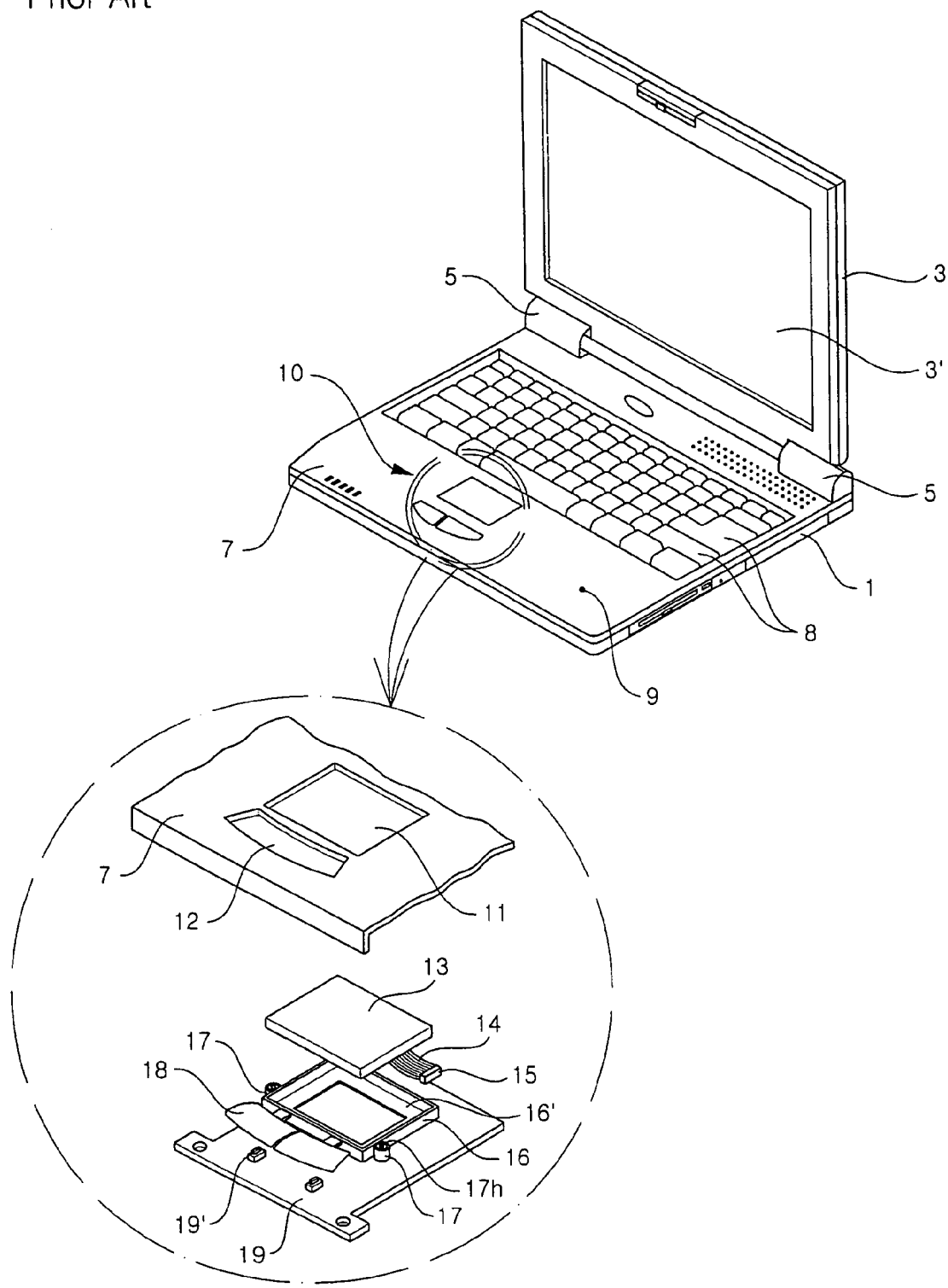
FIG. 1 is an exploded perspective view showing the exterior of a portable computer equipped with a touch pad device according to the prior art.

Hereinafter, a preferred embodiment of the present invention will be described with reference to the accompanying drawings. In the following description and drawings, the same reference numerals are used to designate the same or similar components, and so repetition of the description on the same or similar components will be omitted.

Figure 2:
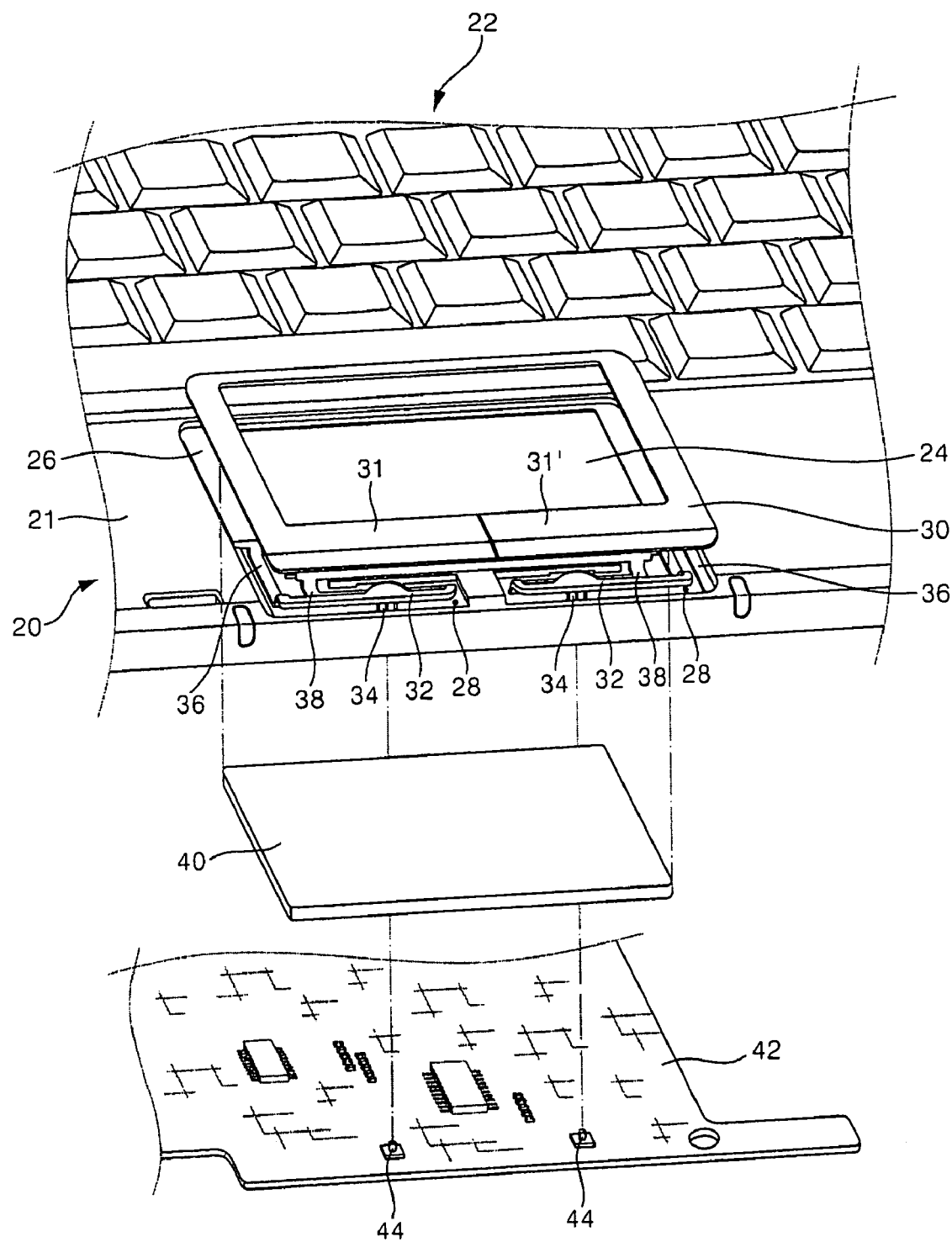
FIG. 2 is an exploded perspective view showing the construction of a touch pad device for a portable computer according to a preferred embodiment of the present invention.
Figure 3:
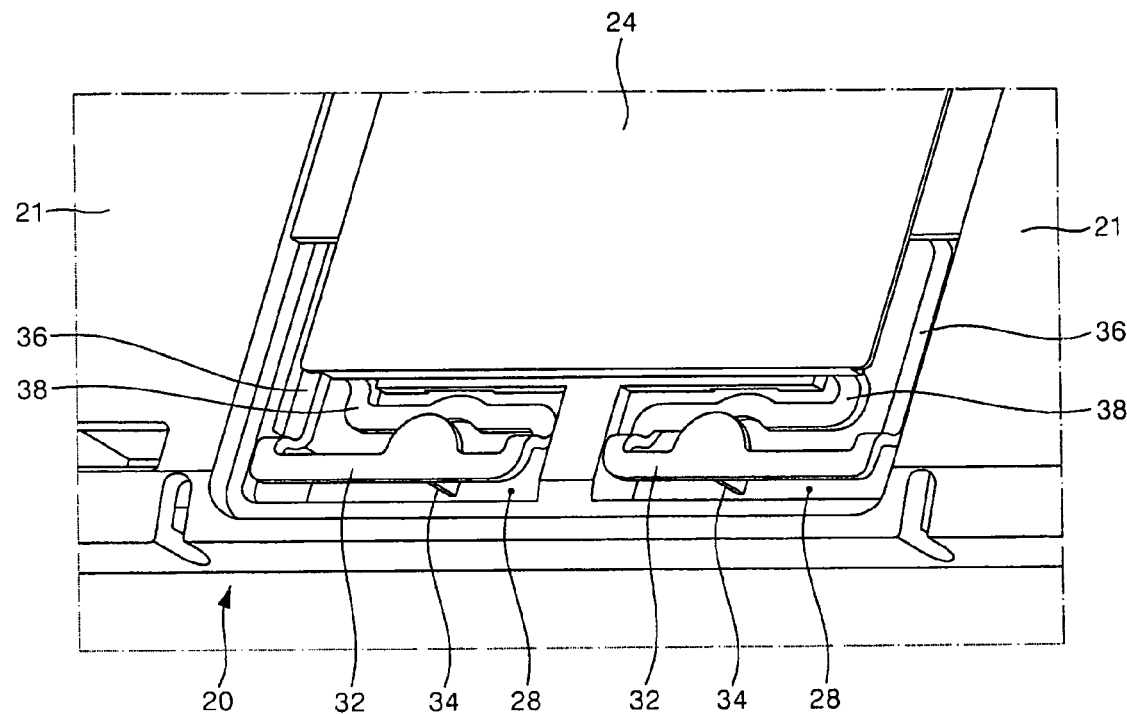
FIG. 3 is a perspective view showing a key deck, from above, according to an embodiment of the present invention.
Figure 4:
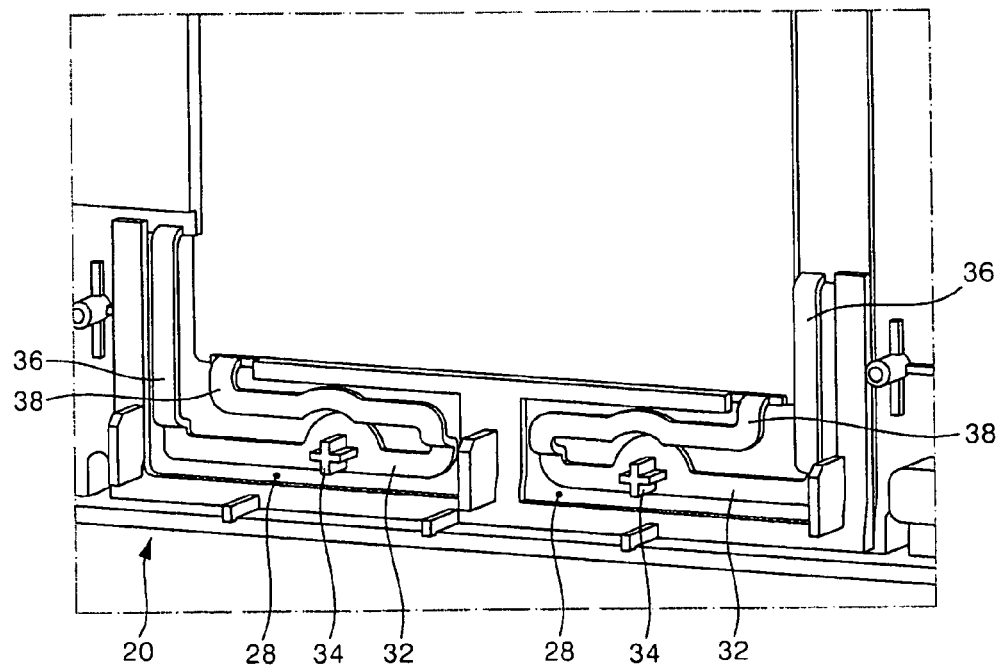
FIG. 4 is a perspective view showing a key deck, from below, according to an embodiment of the present invention.

FIG. 2 is an exploded perspective view showing the construction of a touch pad device for a portable computer according to a preferred embodiment of the present invention. FIG. 3 is a perspective view showing a key deck, from above, according to an embodiment of the present invention. FIG. 4 is a perspective view showing a key deck, from below, according to an embodiment of the present invention.

As shown in the drawings, the key deck 20 forms the exterior of the outer surface of the main unit of the portable computer. Although the key deck 20 generally forms the exterior of the upper surface of the main unit, it may also form the front surface, rear surface, and parts of both lateral surfaces of the main unit. The key deck 20 has an elongated armrest 21 extending from the left to the right side of the upper surface of the key deck 20 near the front end thereof. The armrest 21 supports the user's hands during input operation using a keyboard 22, which includes a number of keys for information input.

The armrest 21 has a touch region 24 formed on an approximately central portion thereof. The touch region 24 is a part of the touch pad device and is adapted to make direct contact with the user's fingers. The touch region 24 may be a part of the surface of the key deck 20 itself. Alternatively, a separate touch sheet (not shown) may be attached to the touch region 24. This is because the touch region 24, which makes direct contact with the user's fingers, may discolor depending on the material or surface treatment of the key deck 20. Of course, the touch sheet must have sufficient resistance to discoloring or wear.

Preferably, the touch region 24 is lower than the surface of the armrest 21. This is for the purpose of preventing the user's hands, when resting on the armrest 21, from making erroneous contact with the touch region 24.

A seating channel 26 is formed all around the touch region 24 with a predetermined width.

Penetration portions 28 are formed between the touch region 24 and the front end of the key deck 20 in the seating channel 26. Particularly, two penetration portions 28 extend through the key deck 20 side by side.

A cover button 30 is seated in the seating channel 26 from above the key deck 20 to cover the penetration portions 28. The user directly presses the cover button 30 with fingers for operation. The cover button 30 has the shape of an approximately square frame with a seam positioned halfway between the penetration portions 28. Both ends of the cover button 30, which adjoin each other along the seam, form first and second button units 31 and 31', respectively, which have a predetermined degree of elasticity resulting from their material and shape.

Push buttons 32 are placed in the penetration portions 28. The push buttons 32 are integrally formed on the key deck 20 and positioned inside the penetration portions 28. Each push button 32 is assigned to the corresponding penetration portion 28. The push buttons 32 have a push protrusion 34 formed on the lower surface thereof, in order to push switches 44 (described later).

The push buttons 32 are connected to the key deck 20 by first and second connection legs 36 and 38, which extend approximately parallel to each other. Although the connection legs 36 and 38 have an L-shaped configuration in the present embodiment, the shape is not limited to that herein and may be varied in accordance with design requirements. However, the connection legs 36 and 38 preferably extend parallel to each other.

A touch pad 40 is attached to the lower surface of the key deck 20 in a position corresponding to the touch region 24 and generates signals in accordance with user's input. In addition to the touch pad 40, various components are mounted on the lower surface of the touch pad 40.

A board 42 is positioned adjacent to the touch pad 40 on the lower surface of the key deck 20. The board 42 has switches 44 mounted thereon, which are toggled on/off by the push protrusions 34, as well as other components related to the touch pad 40. The board 42 may be retained on the lower surface of the key deck 20 or mounted on a bottom case (not shown). The board 42 is positioned so as to maintain a predetermined gap between the switches 44 and the push protrusions 34 of the push buttons 32.

The operation of the touch pad device for a portable computer, constructed as above, will now be described in detail.

The touch pad 40 is attached to the lower surface of the key deck 20 in a position corresponding to the touch region 24 using double-faced tape, for example. The cover buttons 30 is positioned in the seating channel 26 formed on the upper surface of the key deck 20. The cover button 30 may be attached to the seating channel 26 using double-faced tape, for example.

After mounting the cover button 30 in the seating channel 26, the first and second button units 31 and 31' are positioned on the corresponding push buttons 32 so that, when the first and second button units 31 and 31' are pressed, the push buttons 32 are compressed accordingly. When the first and second button units 31 and 31' are released, they return to the original position together with the push buttons 32, due to elastic restoration force.

The board 42 is retained on the lower surface of the key deck 20 or the bottom case with the switches 44 mounted thereon, which are toggled on/off by the push buttons 32. The switches 44 are positioned adjacent to the push protrusions 34 of the push buttons 32.

The touch sheet is attached to the touch region 24 in accordance with design requirements. For example, double-faced tape is used to attach the touch sheet. The touch sheet is made of a material which is not easily discolored due to sweat, sebum, or cosmetics from the user's fingers.

After the touch pad device is assembled in this manner, the user touches the touch region 24 with a finger to determine the position of the cursor and inputs the selected position by pressing the first and second button units 31 and 31' with another finger.

When the first and second button units 31 and 31' are pressed, the push buttons 32 are compressed accordingly and the push protrusions 34 of the push buttons 32 toggle on/off the switches 44 of the board 42.

The touch pad device for a portable computer according to the present invention is advantageous in that, since the push buttons are integrally formed on the key deck while being able to deform elastically, the number of components of the touch pad device decreases. This reduces the manufacturing cost.

In addition, no tool or equipment is additionally necessary to mount the push buttons on the key deck. This makes the assembly process of the touch pad device simple.

Furthermore, the gap between the switches and the push buttons can be set more accurately. Even when the push buttons are pressed repeatedly for a long period of time, they retain the initial position and maintain the operation reliability of the touch pad device.

Although a preferred embodiment of the present invention has been described for illustrative purposes, those skilled in the art will appreciate that various modifications, additions and substitutions are possible, without departing from the scope and spirit of the invention as disclosed in the accompanying claims.

For example, although the cover button 30 is formed all around the touch region 24 in the above embodiment, it may just cover the penetration portions 28 and the push buttons 32.

What is claimed is:

1. A touch pad device for a portable computer comprising:
   a key deck;
   a touch region formed on a portion of the key deck;
   penetration portions extending through the key deck while being adjacent to the touch region;
   push buttons integrally formed with the key deck while being able to deform elastically inside the penetration portions;
   a touch pad formed on a lower surface of the key deck in a position corresponding to the touch region for information input;
   a cover button mounted on an upper surface of the key deck to cover at least the push buttons and the penetration portions, the cover button having first and second button units able to deform elastically and compress the push buttons; and
   a board having switches toggled on and off by pushing the button units.

2. The touch pad device for a portable computer as claimed in claim 1, push protrusions are formed on lower surfaces of the push buttons to make contact with the switches, respectively, and the push buttons are integrally connected to the key deck by first and second connection legs able to deform elastically.

3. The touch pad device for a portable computer as claimed in claim 2, wherein the first and second connection legs are parallel to each other and connect the push buttons to the key deck.

4. The touch pad device for a portable computer as claimed in claim 1, wherein the touch region has a touch sheet.

5. The touch pad device for a portable computer as claimed in claim 1, wherein a seating channel is formed around a periphery of the touch region, and the penetration portions are formed inside the seating channel.

6. The touch pad device for a portable computer as claimed in claim 5, wherein the cover button is mounted in the seating channel in a shape corresponding to a shape of the seating channel, and the first and second button units are delimited by a seam formed on the cover button and correspond to the respective push buttons.

* * * * *